March 27, 1928.  L. EMANUELI  1,663,878
MULTIPLE CONDUCTOR HIGH TENSION CABLE
Filed Sept. 2, 1925
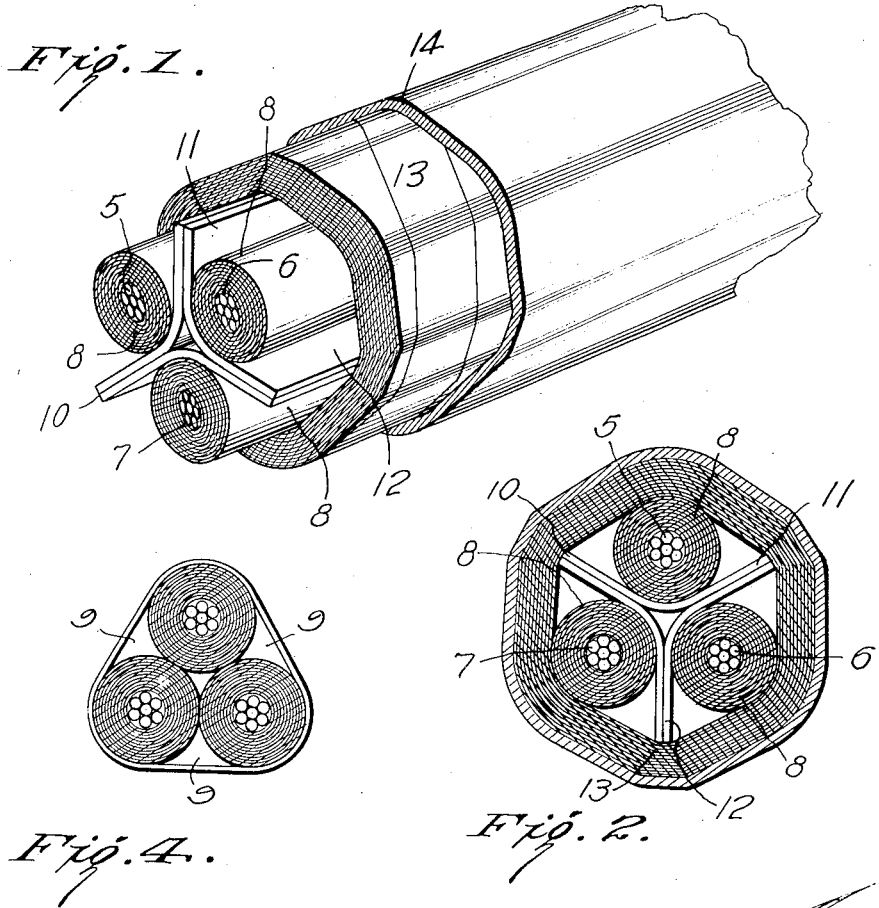
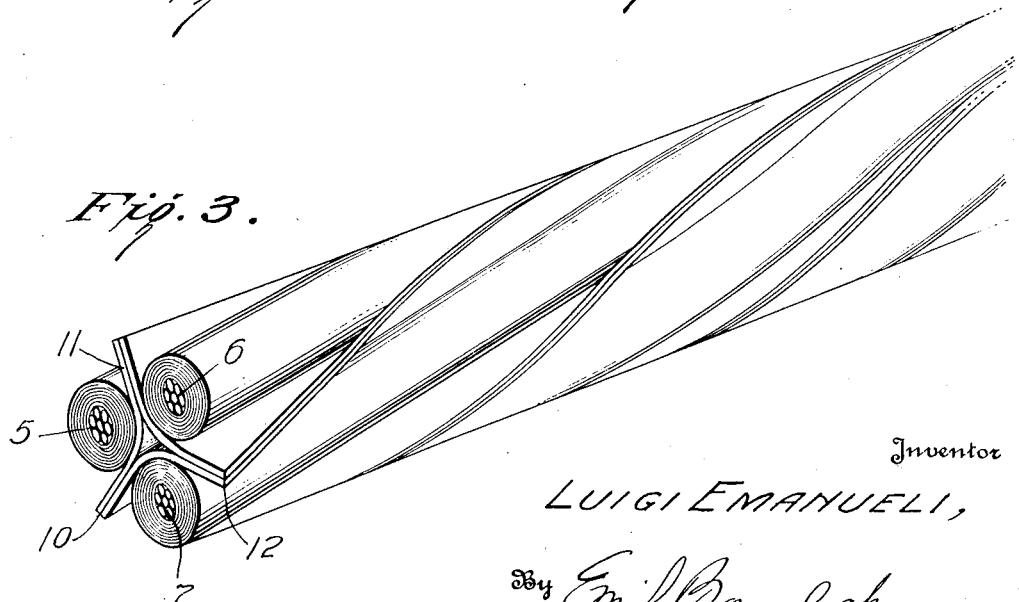
Inventor
LUIGI EMANUELI,
By Emil Bonnelycke,
Attorney Patented Mar. 27, 1928.                                                                         1,663,878

UNITED STATES PATENT OFFICE.

LUIGI EMANUELI, OF MILAN, ITALY, ASSIGNOR TO SOCIETA ITALIANA PIRELLI, OF MILAN, ITALY, A CORPORATION OF ITALY.

MULTIPLE-CONDUCTOR HIGH-TENSION CABLE.

Application filed September 2, 1925. Serial No. 54,042.

Three core cables as ordinarily made have three separate cores, each comprising an electric conductor which is surrounded by layers of impregnated paper, the longitudinal spaces between the cores being filled or packed with impregnated paper, jute or other similar insulating material and in such a way as to form a round body. The body thus formed is then wrapped with several layers of impregnated paper after which the lead sheath is applied.

In a cable so constructed there is nothing to take care of the expansion and contraction of the impregnating material and it may happen that when the cable is cold many voids may exist between the sheath and the conductors which will seriously impair the effectiveness of the insulation and render the cable as a whole less able to withstand high voltages.

On the other hand, a type of cable which is particularly well adapted to carry high tension electric currents is one having a single hollow core over which the small wires forming the conductor are stranded or wound. The wires are tightly wound with insulating material, such as paper, and surrounding this is a lead sheath. The core is filled with oil which impregnates the insulating material and as the cable is alternately heated and cooled the oil expands and contracts and in so doing flows into or out of suitable reservoirs provided for the purpose. To put three of these hollow-core conductors in a single sheath, however, would result in an excessively expensive cable due chiefly to the large diameter and the amount of material incident thereto.

The object of my invention is to provide a multiple conductor cable which shall have all the advantages of oil circulation with ample space for the oil while preserving about the same diameter and approximate contour as the ordinary type of cable having solid insulators.

For a consideration of what I believe to be novel and my invention, attention is directed to the accompanying description and the claims appended thereto.

In the drawing which is illustrative of my invention, Fig. 1 is a perspective view of one end of a cable; Fig. 2 is a cross sectional view of a cable; Fig. 3 is a view in side elevation of a portion of a cable and Fig. 4 is a diagram.

5, 6 and 7 indicate three separate conductors or cores, each of which is covered with a tightly wound body of insulation 8 such as paper, which is impregnated with oil. The cores are spaced 120 degrees apart and are spirally arranged after the fashion of hemp rope as shown in Fig. 3. The pitch of the spiral depends upon the size of the cores and their insulations; a pitch of from two to four feet will be suitable for most cases. Surrounding the cores is a wrapping or covering of insulation and outside of that a lead sheath, as will appear later.

If the three cores are assembled in triangular form, with their insulating coverings in engagement and with an outside wrapping, all as shown in Fig. 4, it will be evident that with cores of any given size the cross section of the cable will be the minimum and that there will be small passages 9 through which oil can flow. This arrangement while having the smallest cross section for cores of a given size, is defective however for a high tension cable for two principal reasons, i. e., the passages for the oil are much too small and the cable as a whole is not adapted to be drawn into manholes and underground conduits on account of its shape.

It is of the utmost importance that the oil passages in the cable be of such size as not to offer undue resistance to the flow of oil since the existence of a vacuum at any point within the cable seriously endangers it. As a matter of fact, to avoid the formation of a vacuum in the cable when it is cooling down, it is necessary to limit the drop in hydrostatic pressure of the oil flowing from the reservoirs to the different parts of the cable.

Suppose we call $a$ the amount required for each unit length for a given drop of temperature. The amount required for a section of length $l$ will be $a \times l$.

If we consider a section with a feeding reservoir or tank at one end, the oil flowing in the channel of the cable will be $a \times l$ near the feeding tank and zero at the opposite end.

For a very short length $dx$ the drop of pressure will be:

$$dp = bg\,dx \quad\quad\quad (1)$$

where $b$ is the coefficient of resistance to the flow of the cable channel and $g$ is the amount of oil flowing in the channel at that special point. If this is at a distance $x$ from the feeding tank $g$ will be equal to $al-ax$.

Substituting in (1) we have:

$$dp = b(al-ax)dx$$

which integrated gives:

$$p = b(alx - \tfrac{1}{2}ax^2)$$

at the point at the end of the section where $x=l$, we have: $p=\tfrac{1}{2}abl^2$ which gives the drop of pressure on the entire length and shows this to be proportional to the coefficient $b$ and to the square of the length.

The coefficient $b$ increases at a ratio much greater than the increase of the cross section of the cable channel, so that by doubling the section $b$ is more than halved. The distance $l$ may be then increased at least 40%, reducing in this way the cost of the expensive fittings to be used at the ends of each section of the line.

To provide oil passages of the proper size and also to avoid the objectionable triangular shape for the cable three separate barriers or separators 10, 11 and 12 are provided and arranged as best shown in Fig. 1. These barriers which are made of impregnated paper, are arranged back to back and extend the whole length of the cable. They are of such width that when bent to the shape shown they will fit within a circle which is tangent to the coverings of the three cores. In addition to forming oil passages, these barriers, being located between the cores, increase the dielectric strength of the oil included between two cores. It is to be noted that each barrier is so arranged that it separates one conductor or core from the other two.

The barriers are relatively thin and surrounding their outer ends and supported by them is a spirally-wound wrapping or covering of impregnated paper 13. The fact that the barriers are spirally arranged (being located between spirally-arranged cores) means that the paper 13 can be wound tightly over their longitudinal edges without crushing them. This is important because it preserves the contour of the finished cable. Furthermore, the cable can be bent as required without injury to the barriers or creating an obstruction in the oil passages.

Due to the fact that the paper 13 is thin and is tightly wound over six equidistant supports, the resulting structure will be substantially hexagonal in cross-section. Where the paper passes over the cores the outer surface will be somewhat more rounded than where it passes over the edges of the barriers. In addition to being supported directly by the cores and barriers the paper in one turn or wrap assists in supporting the paper in adjacent turns. Surrounding the paper wrapping is a lead sheath 14 which is made fluid tight as are the joints so as to retain the oil in the passages within the cable.

My improved construction has the advantage that the oil passages have approximately double the cross section of those shown in Fig. 4 and hence the reservoirs can be quite widely spaced. Further, I obtain the great benefits of an oil-containing cable without any serious increase in cost over the old form of cable. My improved cable also has the requisite degree of flexibility to permit of its being fed through manholes into conduits without injury.

What I claim as new and desire to secure by Letters Patent of the United States is:

1. A multiple-conductor, oil-filled high tension electric cable comprising a plurality of insulated spirally-arranged conductors, spirally-arranged barriers between the conductors, a covering of insulating material which is supported conjointly by the conductors and the peripheral edges of the barriers, said barriers and covering cooperating to form individual longitudinal oil passages for the conductors and wherein the same are disposed, and a metallic sheath for said covering.

2. A multiple-conductor, oil-filled high tension electric cable comprising a plurality of spirally-arranged conductors each of which is covered with insulation, independent and spirally-arranged barriers which are bent where they pass between the conductors and have outer longitudinal edges that form supports, a covering of insulating material which is spirally wrapped around the conductors and outer edges of the barriers and is supported conjointly thereby, said barriers and covering defining a plurality of independent longitudinal oil passages for the individual conductors and whereby the same are disposed, and a metallic sheath for the covering.

3. An oil-filled high tension electric cable comprising three spirally-arranged conductors each of which is covered with oil impregnated insulation, a spirally-arranged barrier for each conductor, said barriers being arranged back to back and extending between the conductor coverings so that each barrier separates one conductor from the other two, and also forms supporting means at its outer longitudinal edges, a covering comprising a strip of impregnated paper which is wound over the conductors and outer edges of the barriers and is supported conjointly thereby, said covering and barriers cooperating to form longitudinal oil passages for the individual conductors and wherein the same are disposed, and a fluid-tight metal sheath which closely surrounds the covering.

In witness whereof, I have hereunto set my hand this 27 day of August, 1925.

LUIGI EMANUELI.